(12) United States Patent
Oberheide et al.

(10) Patent No.: US 6,612,621 B2
(45) Date of Patent: Sep. 2, 2003

(54) MODULAR FUEL FILLER SYSTEM

(75) Inventors: G. Clarke Oberheide, Troy, MI (US);
Herbert Gruber, Rochester Hills, MI (US)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/725,993

(22) Filed: Nov. 29, 2000

(65) Prior Publication Data

US 2002/0063425 A1 May 30, 2002

(51) Int. Cl.⁷ .................................................. G65B 1/04
(52) U.S. Cl. ........................ 285/252; 285/226; 220/86.2
(58) Field of Search ................................ 285/226, 241, 285/242, 252, 253, 256; 220/86.2

(56) References Cited

U.S. PATENT DOCUMENTS

| 953,422 | A | * | 3/1910 | Jost | 285/253 X |
|---|---|---|---|---|---|
| 1,572,049 | A | * | 2/1926 | Stephenson | 220/86.2 X |
| 2,138,104 | A | | 11/1938 | Kellogg | 220/86.2 X |
| 3,838,713 | A | | 10/1974 | Tubbs | 220/86.2 X |
| 4,079,952 | A | | 3/1978 | Nishio et al. | 220/86.2 X |
| 4,224,167 | A | | 9/1980 | Buttigieg | |
| 4,462,620 | A | | 7/1984 | Bambenek et al. | 220/86.2 X |
| 4,718,568 | A | | 1/1988 | Dal Palu | |
| 4,730,652 | A | | 3/1988 | Bartholomew | 220/86.2 X |
| 4,813,453 | A | | 3/1989 | Jenkins et al. | 220/86.2 X |
| 4,819,970 | A | | 4/1989 | Umehara | |
| 4,941,587 | A | | 7/1990 | Terada | 220/86.2 X |
| 5,375,633 | A | | 12/1994 | Bucci | 220/86.2 X |
| 5,437,317 | A | | 8/1995 | Takatsuka et al. | 220/86.2 X |
| 5,476,080 | A | | 12/1995 | Brunnhofer | |
| 5,735,322 | A | | 4/1998 | Palvolgyi | 220/86.2 X |
| 5,752,553 | A | | 5/1998 | Kmiecik et al. | 220/86.2 X |
| 5,829,619 | A | | 11/1998 | Gupta et al. | 220/86.2 |
| 5,960,977 | A | | 10/1999 | Ostrander et al. | |
| 6,019,348 | A | | 2/2000 | Powel | 220/86.2 X |

FOREIGN PATENT DOCUMENTS

DE 3422345 12/1985 ............ 220/86.2 X

* cited by examiner

*Primary Examiner*—David Bochna
(74) *Attorney, Agent, or Firm*—Clark Hill PLC

(57) ABSTRACT

A modular fuel fuller system comprises a filler head, a connector, a filler pipe, a jumper hose and clamps. The jumper hose and clamps interconnect the filler pipe and a spud of a vehicle fuel tank. The filler pipe is a stainless steel filler pipe with a series of formed convolutions for increasing the flexibility of the filler pipe to allow easy installation and provide crash integrity to the fuel filler system within an automotive vehicle.

1 Claim, 2 Drawing Sheets

MODULAR FUEL FILLER SYSTEM

BACKGROUND OF THE INVENTION

1) Field of the Invention

This invention relates to a modular fuel filler system for an automotive vehicle incorporating a stainless steel filler pipe. In particular, this invention relates to a modular fuel filler system which can incorporate a flexible stainless steel filler pipe having a series of formed convolutions, optionally in conjunction with an onboard refueling vapor recovery (ORVR) system.

2) Description of the Related Art

Currently available fuel filler systems as illustrated at 10 in the prior art FIG. 1, use a carbon steel filler pipe 12 with an integrally formed fill head 14. The filler pipe 12 is bent to a desired contour to fit within the space available in the vehicle. The filler pipe 12 is connected to a spud 16 of a fuel tank 18 by a flexible jumper hose 20. Clamps 21 attach the jumper hose 20 to the respective ends of the spud 16 and filler pipe 12.

In recent years, the diameter of the filler pipe 12 has been reduced in response to changes in government regulations to mandate ORVR. However, the size of the filler head 14 has not significantly changed. As a result, the filler head 14 must be formed and mandrel expanded from a relatively heavy gage pipe which must be carried through the length of the pipe.

Additionally, carbon steel tubing must be coated to resist the corrosive environment of the fuel fill system. Steel tubing is strong yet ductile, has low permeation, and is conductive for electrostatic discharge dissipation. However, a fill system incorporating carbon steel tubes must utilize relatively expensive elastomeric multi-layered hose to provide sufficient flexibility for installation tolerance, vehicle body movement, and crash integrity.

Alternatively, multilayer plastic tubing has also been proposed to eliminate the need for a jumper hose. However, plastic tubing does not meet fire tests and pull force retention tests.

SUMMARY OF THE INVENTION

The disadvantages of the prior art may be overcome by providing a modular fuel filler system incorporating a stainless steel filler pipe.

The subject invention relates to a modular fuel filler system incorporating a stainless steel filler pipe having a series of formed convolutions for increasing the flexibility of the filler pipe to allow easy installation and provide crash integrity.

BRIEF DESCRIPTION OF THE DRAWINGS

In drawings which illustrate an embodiment of the invention.

DETAILED DESCRIPTION OF THE INVENTION

Figure 1:
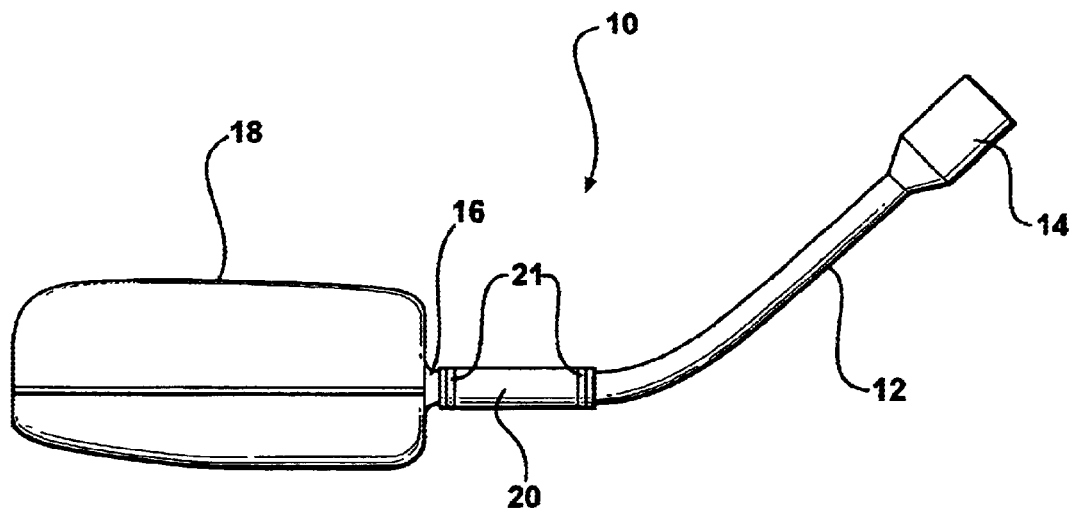
FIG. 1 is an elevational view illustrating a typical fuel filler system of the prior art.
Figure 2:
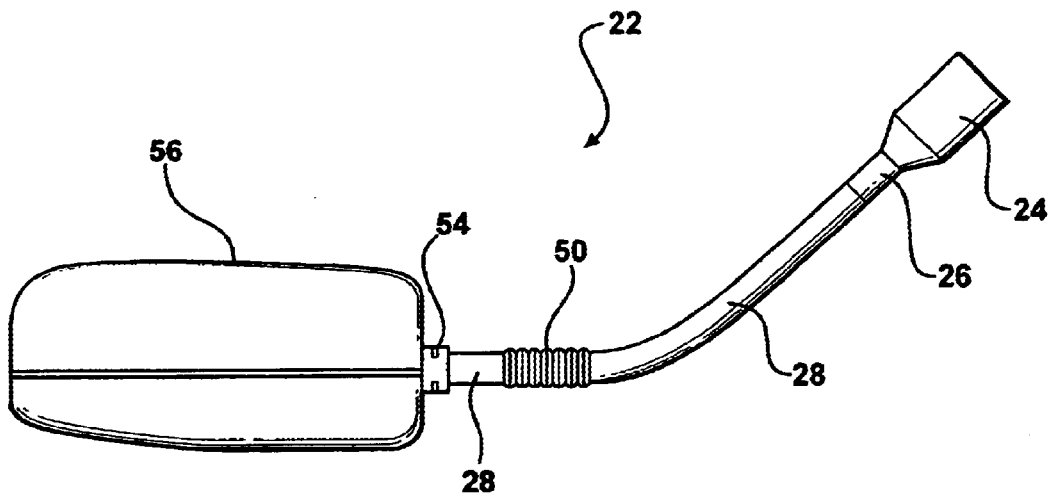
FIG. 2 is an elevational view illustrating a fuel filler system of the present invention.
Figure 3:
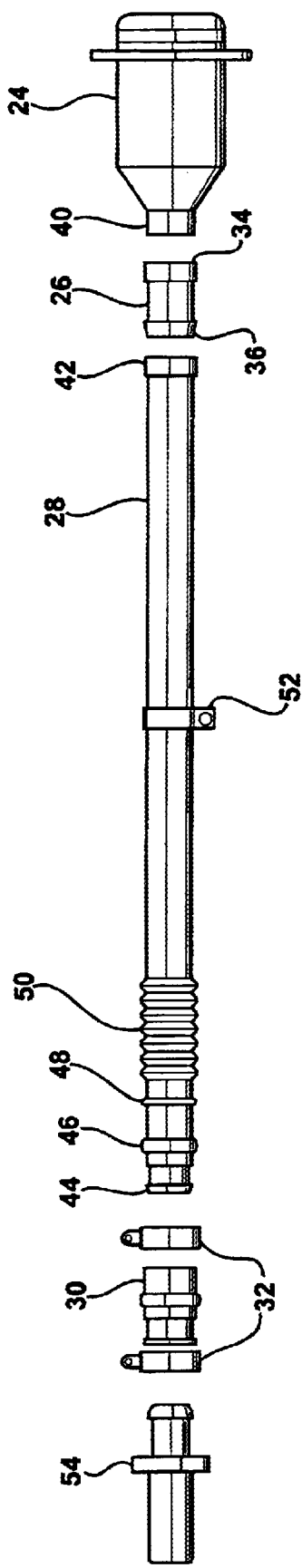
FIG. 3 is an exploded perspective view of the fuel filler system of FIG. 2.
Figure 4:
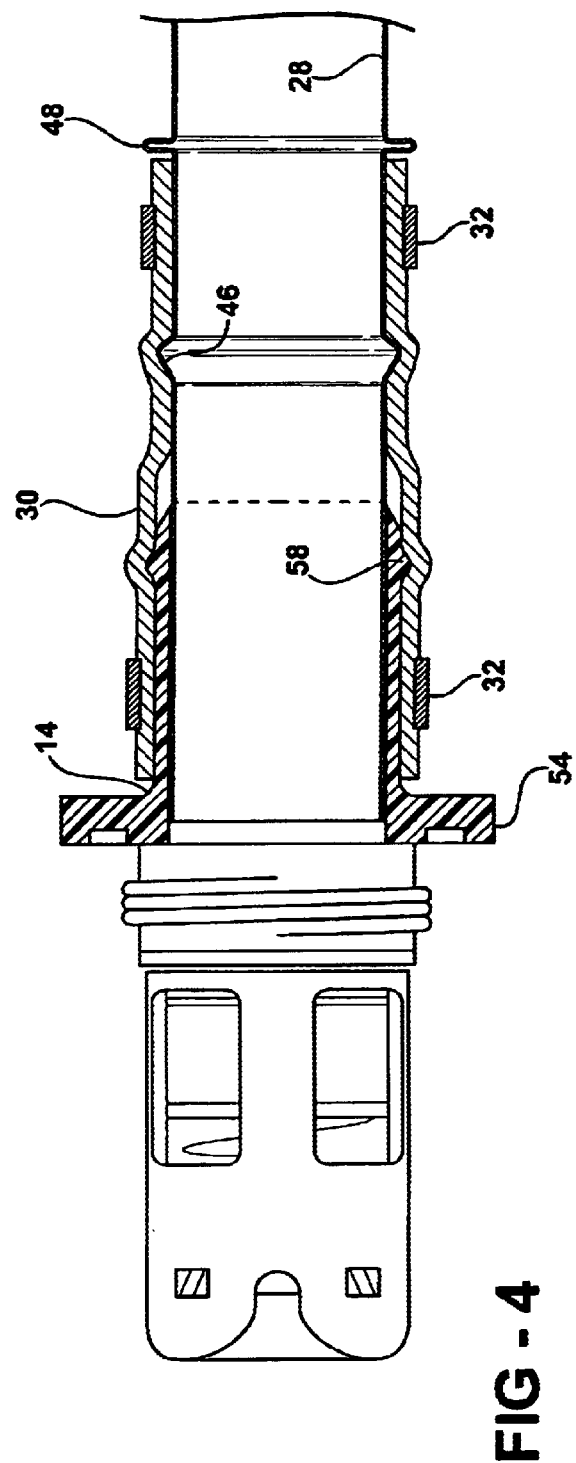
FIG. 4 is a partial sectional view of the connection between the filler pipe and the spud of the fuel filler system of FIG. 2.

Referring to FIGS. 2–4, the fuel filler system 22 of the present invention is illustrated. The fuel filler system 22 generally comprises a filler head 24, a connector 26, a filler pipe 28, a jumper hose 30 and clamps 32.

The filler head 24 is manufactured is the same manner as the filler head 14 of the prior art except that the length of pipe required is reduced to form a modular head. The shell of the filler head 24 is formed out of metal, preferably carbon and stainless steel, using reliable and economical methods such as a transfer pressing, flow forming or hydroforming. Preferably, filler head 24 is a standard ORVR shell adaptable for any ORVR filler pipe application with the post-formed assembly of the insert and flange for vehicle attachment.

The connector 26 has a female end 34 and a male end 36. The female end 34 is an expanded diameter which receives the male end 40 of the filler head 24. The male end 36 is a hose barb. Preferably, the connector 26 is welded or brazed to the filler head 24.

The filler pipe 28 has a female end 42 and a male end 44. The female end 42 is an expanded diameter which receives the male end 36 of connector 26. The male end 44 has a hose barb 46 spaced from the remote end of the filler pipe 28. A small flange 48 is formed at the male end 44. Adjacent the male end 44 is a series of convolutions 50. The convolutions 50 are integrally formed in the filler pipe 28 using known methods, including hydroforming. The diameter and wall thickness of the filler pipe 28 is significantly reduced in comparison with the prior art filler pipe 12. The pipe intermediate the convolutions 50 and the female end 42 may be bent to a desired configuration to fit within the confines of the vehicle. A clamp 52 attaches the filler system 22 to the vehicle.

The convolutions 50 increase the flexibility of the filler pipe 28, which is important for installation and crash integrity. The convolutions 50 allow the male end 44 of the filler pipe 28 to be manipulated during installation to align the male end 44 with the spud 54 of the fuel tank 56 as shown in FIGS. 2 and 4. During a crash, the convolutions 50 allows the filler pipe 28 to flex, performing in the same manner as the elastomeric jumper hose 20 of the prior art fuel filler system 10.

Preferably, the filler pipe 28 is stainless steel. Stainless steel is advantageous in that it offers improved corrosion resistance over surface coated carbon steel pipes. Optionally, the stainless steel pipe could be annealed in a special atmosphere to darken the finish to minimize the shininess of the pipe.

The jumper hose 30, which is an elastomeric hose, seals the male end 44 of filler pipe 28 to the fuel tank spud 54. The jumper hose 30 is relatively short in comparison with prior art fuel filler systems. The jumper hose 30 extends over the barb 46 and a barb 58 on spud 54, as shown in FIG. 4, and is clamped by clamps 32 to sealingly connect the filler pipe 28 to the fuel tank spud 54.

The fuel filler system 22 of the present invention has advantages over the fuel filler system of the prior art. In particular, the amount of elastomeric jumper hose is reduced. The gage of the filler pipe 28 is reduced. The filler pipe 28 outside diameter reinforces the polyethylene spud against hose clamp pressure. A simple male high density polyethylene (HDPE) fill spud can be used which can be hot plate welded to a HDPE fuel tank. If the clamps 32 are worm screw type hose clamps, a relatively strong structure can be established for improved crash integrity. It is now apparent to those skilled in the art that the filler pipe 28 could also be made from a plastic multi-layer tubing depending on the particular application.

The above-described embodiment of the invention is intended to be an example of the present invention and alterations and modifications may be effected thereto, by those of skill in the art, without departing from the scope of the invention.

What is claimed is:

1. A modular fuel filler system for connection to a fuel tank of an automotive vehicle comprising:

an elongated stainless steel filler pipe extending between a male end and a female end, said filler pipe having a series of formed convolutions adjacent said male end for increasing the flexibility of the filler pipe thereby allowing easy installation with the vehicle and providing crash integrity to the modular fuel filler system;

a filler head in fluid communication with said female end of said filler pipe, said filler head having a diameter greater than the diameter of said filler pipe;

a connector interconnected between said filler head and said female end of said filler pipe;

a flexible jumper hose connected to said male end of said filler pipe opposite said filler head and adapted to connect the modular fuel filler system to the fuel tank said male end of said filler pipe including an externally projecting hose barb interlockingly engaging and hooking with said jumper hose to retain said jumper hose on said male end of said filler pipe and a radially projecting annular flange positioned between said hose barb and said convolutions for abutting with the end of said jumper hose and locating said jumper hose on said male end of said filler pipe;

said filler head including a male end and said connector including opposite female and male ends; said female end of said connector having an expanded diameter to receive said male end of said filler head and said male end of said connector having a hose barb interlockingly received in said female end of said filler pipe; and a clamp positioned around said jumper hose and said filler pipe between said hose barb and said convolutions for tightly securing said jumper hose to said male end of said filler pipe.

\* \* \* \* \*

UNITED STATES PATENT AND TRADEMARK OFFICE
CERTIFICATE OF CORRECTION

PATENT NO.     : 6,612,621 B2
DATED          : September 2, 2003
INVENTOR(S)    : Oberheide et al.

It is certified that error appears in the above-identified patent and that said Letters Patent is hereby corrected as shown below:

Column 2,
Line 3, "manufactured is" should be-- manufactured in --.

Signed and Sealed this

Twenty-first Day of October, 2003

JAMES E. ROGAN
*Director of the United States Patent and Trademark Office*